United States Patent
Moerbe et al.

(10) Patent No.: US 9,897,073 B2
(45) Date of Patent: Feb. 20, 2018

(54) METHOD FOR DAMPING TORSIONAL VIBRATIONS IN A POWER GENERATION PLANT

(71) Applicant: Robert Bosch GmbH, Stuttgart (DE)

(72) Inventors: Matthias Moerbe, Ilsfeld-Helfenberg (DE); Ralf Schmidt, Gerlingen (DE); Andreas Quell, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 653 days.

(21) Appl. No.: 14/358,793

(22) PCT Filed: Oct. 24, 2012

(86) PCT No.: PCT/EP2012/004433
§ 371 (c)(1),
(2) Date: Aug. 20, 2014

(87) PCT Pub. No.: WO2013/072005
PCT Pub. Date: May 23, 2013

(65) Prior Publication Data
US 2014/0375055 A1    Dec. 25, 2014

(30) Foreign Application Priority Data

Nov. 18, 2011 (DE) .................. 10 2011 118 831

(51) Int. Cl.
*F03D 9/00* (2016.01)
*H02P 9/04* (2006.01)
(Continued)

(52) U.S. Cl.
CPC ......... *F03D 7/0296* (2013.01); *F03D 7/0224* (2013.01); *F03D 7/0272* (2013.01);
(Continued)

(58) Field of Classification Search
CPC .... F03D 7/0272; F03D 7/0296; F03D 7/0224; F03D 7/0248; F05B 2260/96;
(Continued)

(56) References Cited

U.S. PATENT DOCUMENTS 3,187,189 A * 6/1965 Lang .................. F03B 15/00
246/169 D
4,189,648 A * 2/1980 Harner .................. F03D 7/0224
290/44
(Continued)

FOREIGN PATENT DOCUMENTS

CN    101012808 A    8/2007
CN    101294543 A    10/2008
(Continued)

OTHER PUBLICATIONS

International Search Report corresponding to PCT Application No. PCT/EP2012/004433, dated Mar. 5, 2013 (German and English language document) (7 pages).
(Continued)

*Primary Examiner* — Tulsidas C Patel
*Assistant Examiner* — Thomas Quigley
(74) *Attorney, Agent, or Firm* — Maginot, Moore & Beck LLP

(57) ABSTRACT

A method for damping torsional vibrations in a power generation plant that includes a drive train, a rotor fitted at a rotor-side end of the drive train, and a generator driven via the drive train and fitted at a generator-side end of the drive train includes determining an angular difference between a first point and a second point on the drive train over time. The method further includes damping torsional vibrations in the drive train on the basis of the time profile of the determined angular difference by correspondingly presetting a load torque of the generator and a drive torque of the rotor.

19 Claims, 1 Drawing Sheet

(51) Int. Cl.
*F03D 7/02* (2006.01)
*F03D 7/04* (2006.01)

(52) U.S. Cl.
CPC ........ *F03D 7/042* (2013.01); *F05B 2270/326* (2013.01); *F05B 2270/334* (2013.01); *Y02E 10/723* (2013.01)

(58) Field of Classification Search
CPC .......... F05B 2270/327; F05B 2270/334; H02P 2101/12; H02P 23/04
USPC ...................................................... 290/44, 55
See application file for complete search history.

(56) References Cited

U.S. PATENT DOCUMENTS

| | | | | |
|---|---|---|---|---|
| 4,435,647 A | * | 3/1984 | Harner | ................ F03D 7/0224 290/44 |
| 5,332,895 A | * | 7/1994 | Rieder | ............... G01D 5/34792 250/231.14 |
| 9,160,266 B2 | * | 10/2015 | Vath | ...................... F03D 7/0296 |

| | | |
|---|---|---|
| 2006/0244425 A1 | 11/2006 | Sihler |
| 2007/0279012 A1 | 12/2007 | Sihler |
| 2009/0025467 A1 | 1/2009 | Suzuki et al. |
| 2010/0133823 A1 | 6/2010 | Schramm et al. |
| 2010/0133828 A1 | 6/2010 | Stegemann et al. |
| 2010/0135798 A1 | 6/2010 | Eggleston |

FOREIGN PATENT DOCUMENTS

| | | |
|---|---|---|
| CN | 101493704 A | 7/2009 |
| CN | 102032112 A | 4/2011 |
| DE | 10 2007 019 907 A1 | 10/2008 |
| EP | 1 816 347 A1 | 8/2007 |
| EP | 2 067 991 A2 | 6/2009 |
| WO | 2011/072820 A2 | 6/2011 |

OTHER PUBLICATIONS

First Office Action and Search Report corresponding to Chinese Patent Application No. 201280067328.4, dated Dec. 16, 2015 (English and German language document) (12 pages).

\* cited by examiner

METHOD FOR DAMPING TORSIONAL VIBRATIONS IN A POWER GENERATION PLANT

This application is a 35 U.S.C. § 371 National Stage Application of PCT/EP2012/004433, filed on Oct. 24, 2012, which claims the benefit of priority to Serial No. DE 10 2011 118 831.6, filed on Nov. 18, 2011 in Germany, the disclosures of which are incorporated herein by reference in their entirety.

BACKGROUND

The present disclosure relates to a method for damping torsional vibrations in a power generation plant, to a computing unit for carrying out the same and to a corresponding power generation plant.

Although, within the scope of this application, the present disclosure will primarily be described with reference to wind power plants, it is not restricted thereto but in principle can be used in all types of power stations and plants in which torsional vibrations of shafts, axles and the like, in particular also of shafts and axles with interposed gearboxes, can occur.

Drive trains, comprising components such as, for example, gearboxes, clutches and connecting elements (shafts), are important constituent parts of various electrical power generation plants, such as, for example, wind power plants, water power plants, etc. The drive train fulfills the task of producing a mechanical connection between a drive (for example a rotor of a wind power plant) and an output (for example an appropriate generator), via which energy is transmitted through a rotational movement. Drive train components, such as gearboxes, are used to transfer the rotational speed and the torque present on the drive to values which correspond to the working range of the generator. Clutches are used as required for isolation between drive and output, and shafts produce the mechanical connection between the components involved. In addition, further components, such as mechanical brakes or the like, can be integrated in the drive train.

Since the components involved cannot be made arbitrarily rigid but have a finite stiffness, excitations can lead to high dynamic loads and vibrations. In particular, natural vibrations can be excited. Such an excitation can result, for example, from a non-constant input power (in the case of wind power plants, for example as a result of wind gusts or wind turbulence), from external interference or from natural movements of other plant components. In addition, vibrations of another origin can result in vibrations in the drive train; in the case of a wind power plant, for example tower vibrations or vibrations on account of the tooth engagements of a gearbox.

Vibrations have a detrimental effect on the service life of the components involved, in particular of the gearbox. Continuous threshold loadings increase the wear of the components affected and lead to shorter replacement intervals, which means a financial and technical burden on the plant and network operator and reduces the plant revenue. In particular from the point of view of the anticipated increasing propagation of wind power plants in the offshore sector in the foreseeable future, this aspect plays a greater and greater role, since the replacement of damaged components is made more difficult there. The result is, therefore, the object of detecting these dynamic excitations and in particular of reducing the vibrations, in order to increase the service life of the components.

WO 2011/072820 A2 discloses a method for damping torsional vibrations in a power generation plant having a drive train, a rotor fitted to a rotor-side end of the drive train and a generator driven via the drive train and fitted to a generator-side end of the drive train, wherein, by using an angular position of the drive train at the generator-side end thereof and an angular position of the drive train at the rotor-side end thereof, a torsional moment acting on the drive train is determined, wherein torsional vibrations are damped by means of appropriate control of the generator.

This method is to be improved further. In particular, control concepts which lead to adequate damping of the torsional vibrations are desirable. It would also be advantageous to have available appropriate sensors (in particular those that are economical and suitable for mass production) which, in particular, are also suitable for updating existing drive trains.

SUMMARY

According to the disclosure, a method for damping torsional vibrations in a power generation plant, a computing unit for carrying out the same and a power generation plant having the features of the disclosure are proposed. Advantageous refinements are the subject matter of the sub claims and of the following description.

The disclosure relates to one possible way of largely suppressing torsional vibrations by simultaneously influencing drive and load moments. The drive moment is influenced by the rotor, the load moment via the generator. Within the context of this application, "rotor" is to designate the part of a power generation plant that is loaded and driven for example by water or wind. The moving part of the generator, on the other hand, is designated by the term "armature".

Within the context of the disclosure, a torsional angle between two points of the drive train is determined. Torsional vibrations are understood to be changes in the torsional angle over time. When, always within the context of this disclosure, mention is made of pre-definition, setting, influencing or control, this can be control in an open or closed control loop.

In a preferred embodiment, the drive moment is influenced, for example by appropriate setting of pitch angles of rotor blades, such that it counteracts accelerations and retardations of the rotor, so that the rotational speed of the rotor remains substantially constant. This leads to a reduction in load peaks in the drive train, in particular in a gearbox. The mean drive moment approaches the maximum drive moment, which increases the power yield. If the rotational speed increases, the drive moment is reduced, and vice versa.

In a further embodiment, the load moment is influenced, for example by charging/discharging intermediate circuit capacitors or by changing an excitation current through the armature, such that it counteracts changes in the torsional angle, so that the torsional angle remains substantially constant. This leads further to a reduction of load peaks in the drive train, in particular in a gearbox. The energy yield is increased. If the torsional angle increases, the load moment is reduced, and vice versa.

One simple possible way of detecting the torsional angle is offered by the use of angle sensors with a rotary element and a detection unit (cf. FIG. 2), wherein the rotary element has markings, which are scanned by the detection unit, distributed over its circumference. The rotary element can in particular be a magnetic wheel, segment wheel, gear wheel, a graduated disk and so on. These sensors are suitable in particular for the determination of rotational speed. If the frequency of the markings detected changes, this can be attributed directly to a rotational speed change. By using the time difference (phase shift) between the markings detected on the rotor side and generator side, the torsional angle can be determined in a simple way. If the phase shift changes, this can be attributed directly to a change in the torsional angle. In this way, the control systems mentioned above for keeping the rotational speed of the rotor and/or the torsional angle constant can be implemented particularly advantageously by using such sensors.

Particularly advantageously suitable for the updating are signal strips which have a number of markings (for example magnetic elements, colored elements, punched elements). These signal strips can be clamped around the drive train at the respective points, for example on the rotor side and/or generator side. An associated detection unit (magnetic, optical, inductive and so on) is fixed in such a way that it is able to detect the markings on the signal strip.

Suitable sensors comprise, for example, a rotary element provided with permanent structures (e.g. permanent magnetic) and a detection unit which detects a signal originating from the rotary element, such as a magnetic sensor (for example a Hall sensor or GMR sensor), which detects a magnetic field originating from the structures of the rotary element. Likewise preferred are sensors which, for example, have detection units which themselves generate a signal and detect signal interference caused by the rotary element (such as magnets together with magnetic sensors), here the rotary element influencing the magnetic field generated by the detection unit. A suitable rotary element here can be a metallic, preferably ferromagnetic, gear wheel, a perforated strip and the like.

In a preferred embodiment, the torsional angle is additionally determined in a shaft driven by the rotor directly (without any transmission ratio), in order in this way to determine the input torque in the shaft. The input torque reflects the direct loading of the drive train as a result of a turbulent wind field. As opposed to this, the torsional angle between input and output shaft is influenced by the load on the generator and further excitations.

A computing unit according to the disclosure, for example a control device of a power station, is equipped, in particular by programming, to carry out a method according to the disclosure.

In addition, the implementation of the disclosure in the form of software is advantageous, since this permits particularly low costs, in particular if an executing computing unit is also used for further tasks and is therefore present in any case. Suitable data storage media for providing the computer program are in particular floppy disks, hard disks, flash memories, EEPROMs, CD-ROMs, DVDs, amongst others. A download of a program via computer networks (Internet, Intranet and so on) is also possible.

Further advantages and refinements of the disclosure can be gathered from the description and the appended drawings.

It goes without saying that the features mentioned above and those still to be explained below can be used not only in the respectively specified combination but also in other combinations or on their own without departing from the scope of the present disclosure.

The disclosure is illustrated schematically in the drawings by using exemplary embodiments and will be described extensively below with reference to the drawings.

DETAILED DESCRIPTION

Figure 1:
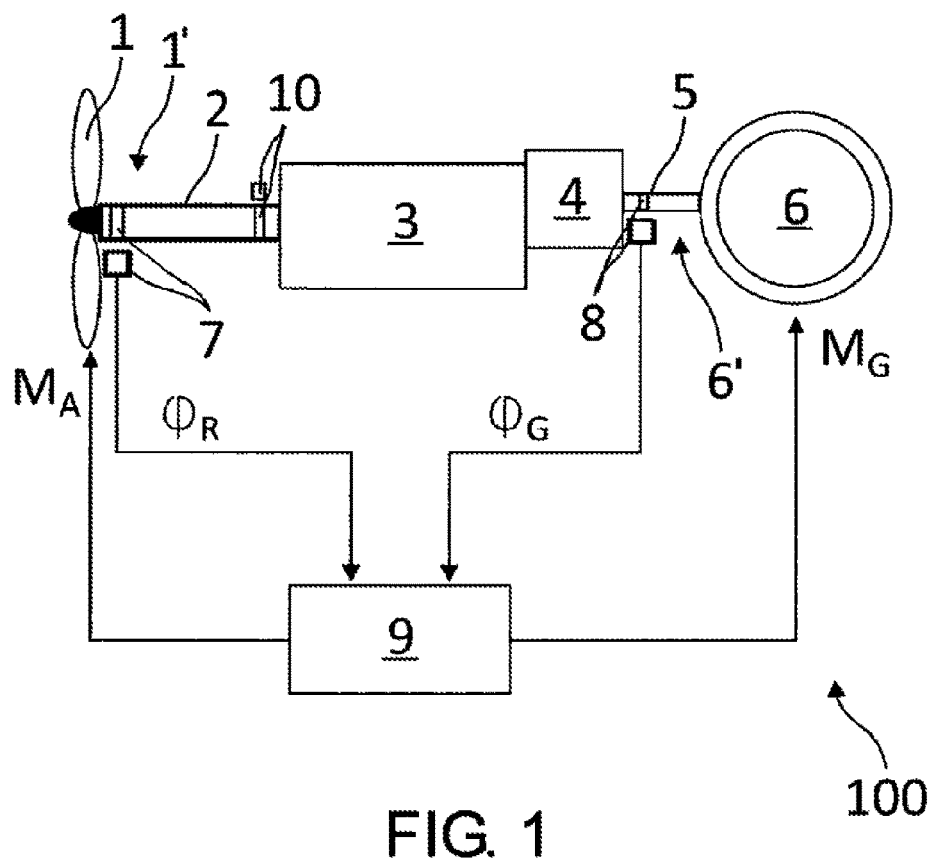
FIG. 1 shows a power generation plant according to a particularly preferred embodiment of the disclosure.

FIG. 1 shows a schematic view of the basic structure of a power generation plant 100 which is equipped to carry out the disclosure. The power generation plant 100 is constructed as a wind power plant having a rotor 1 and an electric generator 6, which are connected mechanically to one another via a drive train having a rotor output shaft 2, a gearbox 3, a clutch 4 and a generator drive shaft 5. The rotor 1 is fitted to a rotor-side end 1' of the drive train 2-5, the generator 6 to a generator-side end 6'. Two position transmitters or angle sensors 7, 8 on the rotor side 1' and the generator side 6' determine the angular positions ($\phi_R$ (rotor 1) and ($\phi_G$ (generator 6), which are transmitted to a computing unit 9. The computing unit is equipped by programming to carry out a method according to the disclosure. In the computing unit 9, control of the generator load moment $M_G$ and of the rotor drive moment $M_A$ is carried out on the basis of the sensor signals.

A further angle sensor 10 is provided on the rotor output shaft 2, at a distance from the angle sensor 7.

From the sensor signals from the sensors 7 and 10, it is possible for a torque of the rotor 1 to be determined, in particular likewise in the computing unit 9; from the sensor signals 10 and 8, a torsional angle over the gearbox 3 (and the clutch) can be determined; from the sensor signals 7 and 8, a torsional angle over the entire drive train 2-5 can be determined.

The sensors 7, 8 and 10 are suitable for simple updating in the present example and have a rotary element formed as a signal strip, and a detection unit. The signal strip can be, for example, a magnetic strip or a perforated strip and is clamped around the relevant shaft.

In the present example, the sensors 7 and 8 each supply a square wave signal, for example. The flank-flank distance "phase shift" corresponds to the angular difference or the torsional angle $\Delta\phi=\phi_R-\phi_G$. The time interval between two markings ("frequency") corresponds to the rotational speed. By means of one or more missing markings or by means of double or multiple markings, an absolute determination of the rotational angle can be carried out. Advantageously, counting the markings can also be used for correction algorithms to compensate for production tolerances. As a result, the measured result becomes more accurate than in the case of a pure frequency measurement.

If the frequency of the markings detected changes, this can be attributed directly to a change in rotational speed. If the phase shift changes, this can be attributed directly to a change in the torsional angle. In this way, the advantageous control systems for keeping the rotational speed of the rotor and/or the torsional angle constant can be implemented particularly advantageously by means of appropriate control of the generator load moment $M_G$ and of the rotor drive moment $M_A$.

Figure 2:
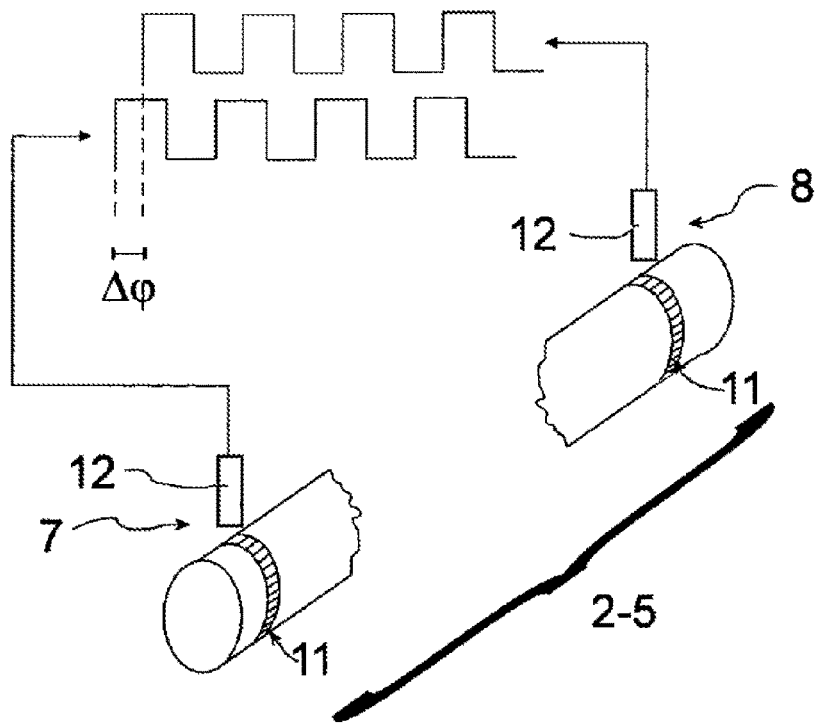
FIG. 2 shows an embodiment of a power generation plant according to a particularly preferred embodiment of the disclosure.

Illustrated schematically in FIG. 2 are the two angle sensors 7 and 8, by using which a preferred possible way of determining the angular difference and the torsional angle $\Delta\phi$ is illustrated below. In the preferred embodiment illustrated, the sensors 7 and 8 each have a rotary element, formed as a signal strip 11, and an associated detection unit 12. The signal strip 11 can, for example, have magnetic poles, which are sensed by a magnetic detection unit 12. The signal that results can, for example, be a square wave signal in each case, as illustrated in FIG. 2.

As described, the angular difference Δφ can be determined from the flank-flank distance. Associated flanks can be determined in particular by means of an absolute assignment of the signal strips. Such an absolute assignment is known, for example from automobile technology ("missing teeth", e.g. a magnetic wheel with 58 teeth ("60-2 teeth")), in conjunction with the determination of the crankshaft angle. For example, it is possible to define a 0° position which, for example, is correlated with the position of a rotor blade.

If the distance between two flanks from the same sensor varies, this corresponds to a change in the rotational speed; if the distance between two flanks from different sensors varies, the torsional angle varies.

The invention claimed is:

1. A method for damping torsional vibrations in a power generation plant including a drive train, a rotor fitted to a rotor-side end of the drive train, and a generator driven via the drive train and fitted to a generator-side end of the drive train, the method comprising:
   determining an angular difference between a first point of the drive train and a second point of the drive train over time; and
   damping torsional vibrations in the drive train on the basis of the variation over time of the determined angular difference by controlling a load moment of the generator and a drive moment of the rotor, wherein damping the torsional vibrations includes controlling the drive moment of the rotor by controlling at least one pitch angle of a rotor blade on the basis of the variation over time of the determined angular difference.

2. The method as claimed in claim 1, wherein determining an angular difference between a first point of the drive train and a second point of the drive train over time comprises:
   determining the angular difference between the rotor-side end and the generator-side end of the drive train.

3. The method as claimed in claim 1, wherein determining an angular difference between a first point of the drive train and a second point of the drive train over time comprises:
   determining the angular difference over a gearbox of the drive train.

4. The method as claimed in claim 1, wherein determining an angular difference between a first point of the drive train and a second point of the drive train over time comprises:
   determining the angular difference over a shaft driven directly by the rotor.

5. The method as claimed in claim 1, wherein a torque is determined from the angular difference.

6. The method as claimed in claim 1, wherein the drive moment of the rotor is controlled so as to counteract a rotational acceleration or retardation of the rotor.

7. The method as claimed in claim 1, wherein the load moment of the generator is controlled so as to counteract a change in the angular difference.

8. The method as claimed in claim 1, wherein control of the load moment of the generator comprises control of an excitation current by an armature winding of the generator.

9. The method as claimed in claim 1, wherein determining an angular difference between a first point of the drive train and a second point of the drive train comprises:
   detecting the angular difference with an angle sensor at the first point on the drive train and a further angle sensor at the second point on the drive train.

10. The method as claimed in claim 9, wherein at least one of the angle sensor and the further angle sensor has at least one rotary element and a detection unit, the rotary element having markings distributed over its circumference with the markings being scanned by the detection unit.

11. The method as claimed in claim 10, wherein an absolute angular position is determined on the basis of a marking irregularity on the rotary element.

12. A computing unit configured to carry out a method for damping torsional vibrations in a power generation plant, the power generation plant including a drive train, a rotor fitted to a rotor-side end of the drive train, and a generator driven via the drive train and fitted to a generator-side end of the drive train, the method comprising:
   determining an angular difference between a first point of the drive train and a second point of the drive train over time, and
   damping torsional vibrations in the drive train on the basis of the variation over time of the determined angular difference by controlling a load moment of the generator and a drive moment of the rotor, wherein damping the torsional vibrations includes controlling the drive moment of the rotor by controlling at least one pitch angle of a rotor blade on the basis of the variation over time of the determined angular difference.

13. A power generation plant, comprising:
   a drive train;
   a rotor fitted to a rotor-side end of the drive train;
   a generator driven via the drive train and fitted to a generator-side end of the drive train; and
   a computing unit configured to carry out a method for damping torsional vibrations in the power generation plant, the method comprising:
      determining an angular difference between a first point of the drive train and a second point of the drive train over time, and
      damping torsional vibrations in the drive train on the basis of the variation over time of the determined angular difference by controlling a load moment of the generator and a drive moment of the rotor, wherein damping the torsional vibrations includes controlling the drive moment of the rotor by controlling at least one pitch angle of a rotor blade on the basis of the variation over time of the determined angular difference.

14. The power generation plant as claimed in claim 13, further comprising at least two angle sensors with a first angle sensor arranged at the first point of the drive train and a second angle sensor arranged at the second point of the drive train.

15. The power generation plant as claimed in claim 14, wherein at least one of the at least two angle sensors includes (i) at least one rotary element having markings distributed over its circumference and at least one irregularity and (ii) a detection unit configured to scan the markings.

16. The power generation plant as claimed in claim 15, wherein the at least one rotary element is configured as a magnetic wheel, a segment wheel, a gear wheel, a graduated disk, or a signal strip.

17. The computing unit as claimed in claim 12, wherein the computing unit is configured as a control device of a power generation plant.

18. The power generation plant as claimed in claim 14, further comprising a third angle sensor arranged at a third point of the drive train between the first angle sensor and the second angle sensor,
   wherein the angular difference between the first point of the drive train and the second point of the drive train over time is a first determined angular difference that is determined via the first and second angle sensors, and wherein the method carried out by the computing unit further includes:
  determining a second angular difference between the first point of the drive train and the third point of the drive train over time via the first and third angle sensors, and
  damping torsional vibrations in the drive train on the basis of the variation over time of the first determined angular difference and the second determined angular difference by controlling the load moment of the generator and the drive moment of the rotor.

19. The method as claimed in claim 1, wherein the determined angular difference between the first point of the drive train and the second point of the drive train over time is a first determined angular difference, the method further comprising:
  determining a second angular difference between the first point and a third point of the drive train over time, the third point disposed between the first point and the second point; and
  damping torsional vibrations in the drive train on the basis of the variation over time of the first determined angular difference and the second determined angular difference by controlling the load moment of the generator and the drive moment of the rotor.

* * * * *